United States Patent
Bolisetty

(10) Patent No.: US 12,147,705 B2
(45) Date of Patent: Nov. 19, 2024

(54) MANAGING DATA COMPACTION FOR ZONES IN MEMORY DEVICES

(71) Applicant: Micron Technology, Inc., Boise, ID (US)

(72) Inventor: Naveen Bolisetty, Suryapet (IN)

(73) Assignee: Micron Technology, Inc., Boise, ID (US)

( * ) Notice: Subject to any disclaimer, the term of this patent is extended or adjusted under 35 U.S.C. 154(b) by 106 days.

(21) Appl. No.: 17/899,092

(22) Filed: Aug. 30, 2022

(65) Prior Publication Data

US 2024/0069806 A1 Feb. 29, 2024

(51) Int. Cl.
*G06F 3/06* (2006.01)

(52) U.S. Cl.
CPC .......... *G06F 3/0659* (2013.01); *G06F 3/0604* (2013.01); *G06F 3/0653* (2013.01); *G06F 3/0679* (2013.01)

(58) Field of Classification Search
CPC .... G06F 3/0659; G06F 3/0604; G06F 3/0653; G06F 3/0679; G06F 2212/7205; G06F 2212/7204; G06F 3/0683
USPC .................................................. 711/103, 154
See application file for complete search history.

(56) References Cited

U.S. PATENT DOCUMENTS

| | | | |
|---|---|---|---|
| 11,422,726 B1* | 8/2022 | Jo ............................ | G06F 3/067 |
| 2021/0223962 A1* | 7/2021 | Esaka ...................... | G06F 3/064 |
| 2021/0263674 A1* | 8/2021 | Shin ...................... | G11C 11/5628 |
| 2022/0011955 A1* | 1/2022 | Juch ...................... | G06F 3/0632 |
| 2022/0300198 A1* | 9/2022 | Gao ...................... | G06F 11/3466 |
| 2023/0088291 A1* | 3/2023 | Tsuji ...................... | G06F 3/0604 |
| | | | 711/154 |
| 2023/0091792 A1* | 3/2023 | Kanno .................. | G06F 3/0679 |
| | | | 711/103 |

* cited by examiner

*Primary Examiner* — Hashem Farrokh
(74) *Attorney, Agent, or Firm* — Lowenstein Sandler LLP

(57) ABSTRACT

A system and method for managing data compaction in zones in memory devices. An example method includes receiving, by a processor of a memory device, receiving, by a processing device, a write command; identifying a zoned namespace (ZNS) zone specified with the write command; selecting a first subset of memory pages of a first management unit that is configured to store a first number of bits per memory cell, wherein the first management unit is associated with the ZNS zone; accessing a capacity counter associated with the ZNS zone that reflects an amount of data currently stored to the ZNS zone; and responsive to determining that the capacity counter satisfies a threshold criterion, causing the memory device to copy the data associated with the ZNS zone from the first subset of memory pages to a second subset of memory pages of a second management unit of the memory device.

20 Claims, 9 Drawing Sheets

| Block No. | SLC BLOCK A | SLC BLOCK B | SLC BLOCK C | SLC BLOCK D | ... | SLC BLOCK m |
|---|---|---|---|---|---|---|
| Zone No. | Z0 | Z4 | Z0 | Z8 | ... | $Z_{n-3}$ |
| | Z1 | Z5 | Z1 | Z9 | ... | $Z_{n-2}$ |
| | Z2 | Z6 | Z2 | Z10 | ... | $Z_{n-1}$ |
| | Z3 | Z7 | Z3 | Z11 | ... | $Z_n$ |

FIG. 6B

SLC BLOCK A

| Z0 | Z1 | Z0 | Z1 | ... | Z0 | Z1 |
|---|---|---|---|---|---|---|
| Z2 | Z1 | Z0 | Z1 | ... | Z0 | Z1 |
| Z3 | Z1 | Z0 | Z0 | ... | Z0 | Z0 | ← Memory page
| Z2 | Z3 | Z1 | Z2 | ... | Z1 | Z2 |
| Z0 | Z2 | Z3 | Z0 | ... | Z3 | Z2 |

SLC BLOCK C

| Z2 | Z2 | Z0 | Z0 | ... | Z3 | Z0 |
|---|---|---|---|---|---|---|
| Z2 | Z2 | Z0 | Z0 | ... | Z3 | Z0 |
| Z2 | Z2 | Z0 | Z1 | ... | Z1 | Z1 |
| Z0 | Z0 | Z3 | Z1 | ... | Z3 | Z3 |
| Z0 | Z2 | Z3 | Z1 | ... | Z3 | Z1 |

| SLC Block | Z0 (% Data) | Z1 (% Data) | Z2 (% Data) | Z3 (% Data) |
|---|---|---|---|---|
| A | 90 | 5 | 5 | 0 |
| C | 90 | 5 | 5 | 0 |
| F | 95 | 0 | 0 | 5 |
| G | 0 | 0 | 0 | 0 | xxx
X10

| Zone No. | Index for SLC Block | | | | | | | | | | |
|---|---|---|---|---|---|---|---|---|---|---|---|
| Location | 0 | 1 | 2 | 3 | 4 | 5 | 6 | ... | n-1 | n |
| Zone 0 | 1 | 0 | 0 | 0 | 1 | 0 | 0 | ... | 0 | 0 |
| Zone 1 | 0 | 1 | 0 | 0 | 0 | 1 | 1 | ... | 0 | 0 |
| Zone 2 | 0 | 0 | 1 | 0 | 0 | 0 | 0 | ... | | 0 |
| Zone 3 | 0 | 0 | 0 | 1 | 0 | 0 | 0 | ... | 1 | 1 |

Present data Indicator

FIG. 8

MANAGING DATA COMPACTION FOR ZONES IN MEMORY DEVICES

TECHNICAL FIELD

Embodiments of the disclosure relate generally to memory sub-systems, and more specifically, relate to managing data compaction for zones in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6A is schematically illustrates example zone-to-block metadata maintained by the memory device, in accordance with aspects of the present disclosure.

FIG. 6B is a conceptual depiction of zone data stored on SLC blocks A and C, in accordance with aspects of the present disclosure.

FIG. 6C is schematically illustrates example block capacity metadata maintained by the memory device, in accordance with aspects of the present disclosure.

FIG. 8 schematically illustrates example data index metadata maintained by the memory device, in accordance with aspects of the present disclosure

DETAILED DESCRIPTION

Figure 1:
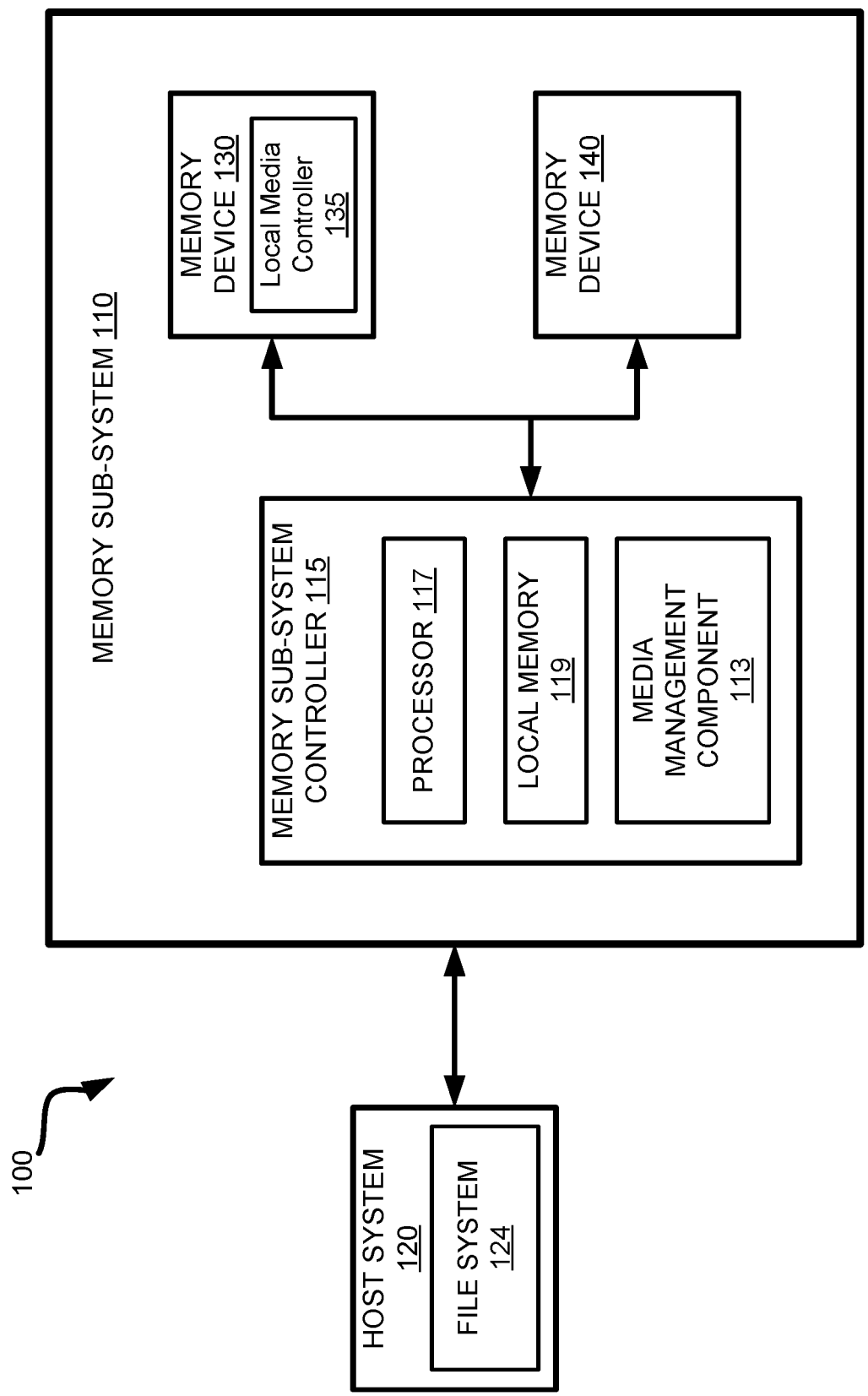
FIG. 1 illustrates an example computing system that includes a host system and a memory sub-system, in accordance with some embodiments of the present disclosure.

Aspects of the present disclosure are directed to managing data compaction for zones in memory devices. The memory sub-system can be a storage device, a memory module, or a combination of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of a non-volatile memory device is a negative-and (NAND) memory device. Other examples of non-volatile memory devices are described in conjunction with FIG. 1. A non-volatile memory device is a package of one or more dies. Each die can include one or more planes. For some types of non-volatile memory devices (e.g., NAND devices), each plane includes a set of physical blocks. Each block consists of a set of pages. Each page includes a set of memory cells ("cells"). A cell is an electronic circuit that store information. Depending on the cell type, a cell can store one or more bits of binary information, and has various logic states that correlate to the number of bits being stored. The logic states can be represented by binary values, such as "0" and "1," or combinations of such values.

Precisely controlling the amount of the electric charge stored by the memory cell allows establishing multiple logical levels, thus effectively allowing a single memory cell to store multiple bits of information. A read operation can be performed by comparing the measured threshold voltages ($V_t$) exhibited by the memory cell to one or more reference voltage levels in order to distinguish between two logical levels for single-level cell (SLCs) and between multiple logical levels for multi-level cells. A memory device can include multiple portions, including, e.g., one or more portions where the sub-blocks are configured as SLC memory and one or more portions where the sub-blocks are configured as multi-level cell (MLC) memory that can store three bits of information per cell and/or (triple-level cell) TLC memory that can store three bits of information per cell. The voltage levels of the memory cells in TLC memory form a set of 8 programming (or threshold voltage (Vt)) distributions representing the 8 different combinations of the three bits stored in each memory cell. Depending on how the memory cells are configured, each physical memory page in one of the sub-blocks can include multiple page types. For example, a physical memory page formed from single level cells (SLCs) has a single page type referred to as a lower logical page (LP). Multi-level cell (MLC) physical page types can include LPs and upper logical pages (UPs) and store two bits of information per cell. Further, TLC physical page types can include LPs, UPs, and extra logical pages (XPs) and store three bits of information per cell. Further, quad-level (QLC) physical page types can include LPs, UPs, XPs and top logical pages (TPs) and store four bits of information per cell. For example, a physical memory page formed from memory cells of the QLC memory type have a total of four logical pages, where each logical page stores data distinct from the data stored in the other logical pages associated with that physical memory page, herein referred to as a "page." MLC memory, TLC memory, QLC memory and PLC memory can be referred to as higher-level cell (HLC) memory.

A memory device typically experiences random workloads, which can impact the threshold voltage (Vt) distributions, which can be shifted to higher or lower values. Further, the read window budget (RWB), e.g., formed from the read window margins (FIG. 4) between threshold voltage distributions, can be impacted by cell-to-cell interference. If these read window margins are degraded from widening Vt distributions, it can be difficult to read the logical states out of the memory cells, resulting in an increased read bit error rate (RBER). Cell-to-cell interference occurs when a next logical program of memory cells (e.g., coupled with wordline n+1 "WLn+1") causes the threshold voltage (Vt) distribution of victim memory cells (e.g., coupled with WLn) to widen, thus degrading the read window margins between Vt distributions of the WLn victim memory cells. In this scenario, the memory cells associated with WLn+1 are physically adjacent to the memory cells associated with WLn. This cell-to-cell interference imparted to the WLn memory cells is a function of the WLn+1 aggressor memory cells incurring a threshold voltage (Vt) swing when being programmed from an erase state to a set of threshold voltage distributions.

Figure 5A:
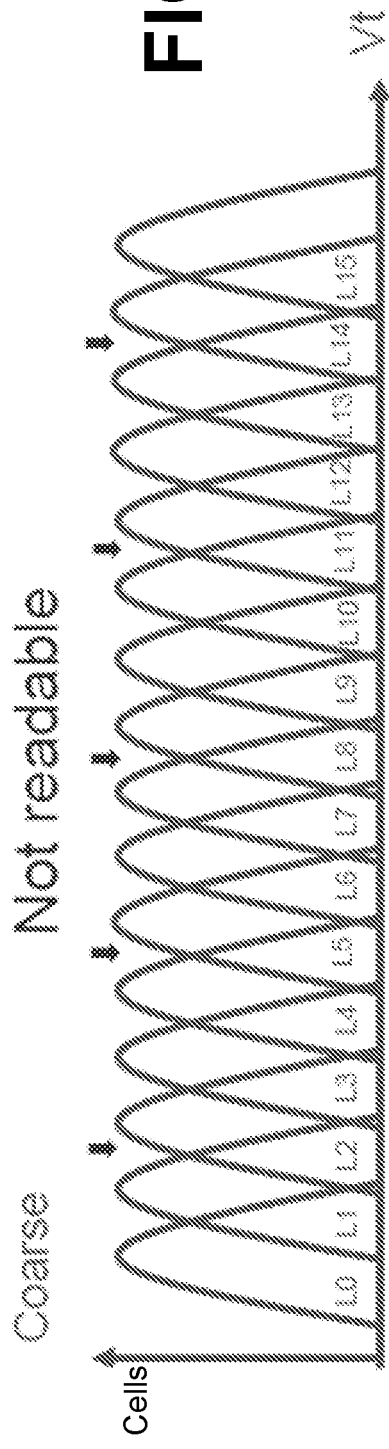
FIG. 5A is a graph illustrating an example of a set of threshold voltage distributions, after coarse programming, that are not readable according to at least one embodiment.

Thus, to minimize cell-to-cell interference, certain memory devices utilize a two-pass, coarse-fine programming algorithm, in which the memory cells associated with $WL_n$ first undergo a coarse programming that results in unreadable $V_t$ distributions (FIG. 5A, which is a graph illustrating an example of a set of threshold voltage distributions after coarse programming). Then, later, after the aggressor memory cells associated with $WL_{n+1}$ have also been coarse programmed, the memory cells associated with $WL_n$ are fine programmed. When this alternating nature of coarse-to-fine programming across wordlines is followed to store a page of data along $WL_n$ and another page of data along WLn+1, final read window margins of a set of threshold voltage distributions become readable (FIG. 5B, which is a graph illustrating an example of a set of threshold voltage distributions, after fine programming). In this way, there is a transition by the $WL_{n+1}$ aggressor memory cells being programmed from an erased $V_t$ distribution to a coarse set of $V_t$ distributions instead of going directly from the erased $V_t$ distribution to the final set of fine $V_t$ distributions, enabling reduction in the cell-to-cell interference as programming progresses due to incurring smaller $V_t$ swings with each programming operation. With a coarse-fine programming algorithm, for example, read window margins for QLC-programmed memory cells can be significantly improved to achieve maximum bits-per-cell for bit-cost scaling.

Figure 5B:
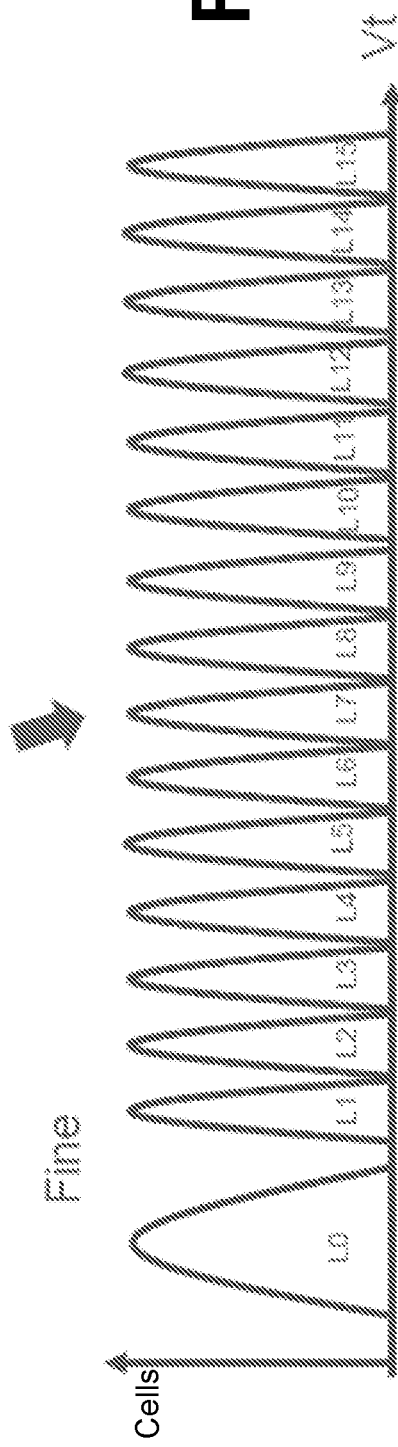
FIG. 5B is a graph illustrating the example of the set of threshold voltage distributions, after fine programming, that are readable according to at least one embodiment.

The coarse-fine programming algorithm can use SLC memory that is dedicated to buffer QLC data that is being programmed. This buffering of data is required because coarse-programmed $V_t$ distributions have heavily-overlapped states (FIG. 5A), and thus are unreadable while waiting to undergo fine programming into final $V_t$ distributions that are readable (FIG. 5B). Thus, the QLC data is first buffered in SLC blocks of memory so the QLC data is available for the fine programming. For example, according to one coarse-fine programming algorithm of QLC memory, at least 5 coarse QLC pages of data (or approximately 20 SLC pages of data) to be programmed across two adjacent wordlines need to be buffered in SLC blocks. To perform the fine-course programming, some memory systems use a media management operation (e.g., a folding operation) in which data is copied from the SLC memory to the QLC memory (or any HLC memory). The media management operation allows for compacting data from the SLC memory into the QLC memory, as multiple bits of SLC data can be stored within a single cell of the QLC memory.

Some memory sub-systems can allocate portions of data to the memory devices and in small increments of data, e.g., four kilobytes (KB). These allocations of a page or a block of data can cause non-sequential and/or random writes to the memory devices. This practice can result in high costs in memory, e.g., dynamic random access memory (DRAM), static random access memory (SRAM), or persistent memory, for storing mapping data structures that track logical-to-physical (LTP) address mapping between logical block address (LBA) space and physical address space of the IC dies. For example, mapping overhead is about a gigabyte (GB) per terabyte (TB) of host addressable media, and thus, a 16 TB solid-state drive (SSD) requires a significant 16 GB of memory mapping overhead. Additionally, periodic snapshotting and logging is done to persist the mapping data structures across shutdowns and surprise power failure situations. This can add additional write overhead to the IC dies and performance loss.

In some implementations, a file system can group data by locality (e.g., according to thread, process, or application) and write the data sequentially to storage devices. The file system can then write data to different localities as parallel streams to storage devices, each stream being associated with its own locality. Locality can reference either temporal locality or spatial locality. Data having temporal locality is data that a processor tends to access repetitively over a short period of time, e.g., data written, over-written, and trimmed around the same time. Data having spatial locality reflects when a memory device references a particular storage location at a particular time, then the memory device is likely to reference nearby memory locations in the near future. Reference to sequential locality is a special case of spatial locality that occurs when data elements are arranged and accessed linearly, such as in traversing the elements in a one-dimensional array.

A "zone" can be a contiguous (or non-contiguous) portion of a memory device (e.g., range of blocks) that is identified and managed as a single unit. Each zone can have a corresponding zone identification data (a zone identifier, a zone descriptor, a zone label, etc.) that can be used to uniquely identify the zone. Zones can be a fixed size in which all of the zones can be the same size or can be a variable size in which the zones can have different sizes. A zoned namespace (ZNS) can be a sequential namespace defined by a specification and divided into a set of equally-sized zones, which are contiguous non-overlapping ranges of logical block addresses. The host system is aware of the zones supported by the memory sub-system and can allocate data to the zones based on the localities shared by the data. The host system can specify, in a write command, the desired zone to program data to.

In some systems, an SLC block(s) can be used as a buffer to temporarily store data from multiple zones. Accordingly, the memory device opens QLC blocks for each respective zone to receive the data from the SLC block(s). Due to the nature of fine-coarse programming, these QLC blocks can remain open for prolonged periods of time. For example, the memory cells associated with a wordline (e.g., $WL_n$) are course programmed during the first pass, but would wait to be fine programmed until the memory cells of an adjacent line (e.g., $WL_{n+1}$) have also been coarse programmed. This causes the cells to experience the phenomenon known as slow charge loss (SCL), where the threshold voltage ($V_T$) of a memory cell can change with time as the electric charge of the cell is diminishing. In addition, maintaining a high number of open blocks causes the memory subsystem to require additional memory for tracking the migrating data, which adds latency and central processing unit (CPU) overhead.

Aspects of the present disclosure address the above and other deficiencies through managing data compaction for zones in memory devices. In particular, the memory sub-system controller can open an SLC block for a single zone or for a set of particular zones and track the zone(s)-to-block relationships in a reference table (e.g., a metadata table). For example, an SLC block can be assigned a first set of zones (e.g., zones 0-3), another SLC block can be assigned a second set of zones (e.g., zones 4-7), and so forth. The zones in each set can be determined, e.g., based on consecutive numbering (e.g., zones 0, 1, 2, and 3 are assigned to one set, zones 4, 5, 6, and 7 are assigned to another set, and so forth) or based on the order of received write commands (e.g., if write commands for zones 0, 2, 7, and 9 are received by the memory sub-system controller, zones 0, 2, 7, and 9 can be grouped into a set). For each received write command, the memory sub-system controller can identify the zone referenced by the write command. The memory sub-system controller can then program the write data to the corresponding SLC block. If an SLC block reaches its capacity, the memory sub-system controller can open another SLC block for the same set of zones.

The memory sub-system controller can track the amount of data stored on SLC blocks for each zone. For example, the memory sub-system controller can track, for each zone (e.g., zone 0), the number of memory pages programed on SLC blocks and the ratio of particular zone-specific data stored to the total capacity of the SLC block, etc. Zone-specific data refers to data assigned, by the host system, to a particular zone. Responsive to determining that a certain amount of zone-specific data is stored in the SLC block(s), the memory sub-system controller can perform a media management operation on the zone specific data. In an illustrative example, the memory sub-system controller can determine whether the data related to zone 0, which is stored on specified SLC blocks, fills at least a predefined portion (e.g., 50%) of the storage capacity of a QLC block. If so, the memory sub-system controller can perform a media management operation on the SLC blocks. For example, the memory sub-system controller can copy the zone 0 data stored on the SLC block(s) to an available QLC block of the memory sub-system. The data can be programmed to the QLC block using coarse-fine programming. Accordingly, all of the data will be programmed in the fine state of coarse-fine programming, thus mitigating slow charge loss.

The memory sub-system controller can copy the remaining data stored on the SLC block(s) (e.g., data related to other zones) to one or more new SLC blocks. For example, the processing logic can copy the data related to the first set of zones (zones 1, 2, and 3) to the one or more new SLC blocks. The processing logic can then perform a maintenance operation (e.g., a garbage collection operation) on the SLC blocks to return the SLC blocks to a free pool for future use. Garbage collection is a process to recover free space by relocating pages with valid data to new blocks, and erasing the blocks from which all valid data has been relocated.

Advantages of the present disclosure include, but are not limited to, an improved performance of the memory sub-system by decreasing slow charge loss from maintaining open blocks for prolonged periods of time. Further advantages include a reduction in latency and CPU overhead from utilizing excess memory for track migrating data. This can result in an improvement of performance and speed of the memory sub-system, a reduction of memory consumption, and a decrease in power consumption by the memory sub-system. Furthermore, this can increase the lifespan of the memory sub-system. Although embodiments are described using memory cells of a NAND flash memory, aspects of the present disclosure can be applied to other types of memory sub-systems FIG. 1 illustrates an example computing system 100 that includes a memory sub-system 110 and a host system 120 in accordance with some embodiments of the present disclosure. The memory sub-system 110 can include media, such as one or more non-volatile memory devices (e.g., memory device 130), one or more volatile memory devices (e.g., memory device 140), or a combination of such. Each memory device 130 or 140 can be one or more memory component(s).

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands from the host system 120 and can convert the commands into appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for memory management within the same memory device package. An example of a managed memory device is a managed NAND (MNAND) device.

The memory sub-system 110 includes a media management component 113 that can be used to manage zone-specific data in accordance with embodiments of the present disclosure. Zone-specific data refers to data assigned, by host system 120, to a particular zone In some embodiments, the memory sub-system controller 115 includes at least a portion of the media management component 113. For example, the memory sub-system controller 115 can include a processor 117 (processing device) configured to execute instructions stored in local memory 119 for performing the operations described herein. In some embodiments, the media management component 113 is part of the host system 120, an application, or an operating system. The media management component 113 can manage memory device 130, as described in more detail herein below.

The computing system 100 maintains a file system 124 in the host system 120 that is configured with data organization functionality discussed herein throughout the Figures. In some embodiments, the host system 120 includes at least a portion of the file organization and storage allocation functionality. In other embodiments, or in combination, the controller 115 and/or a processing device of the host system 120 includes at least a portion of the file organization and storage allocation functionality. For example, the controller and the processing device (processor) of the host system 120 can be configured to execute instructions stored in memory for performing the operations of the file organization and storage allocation functionality described herein.

Figure 2:
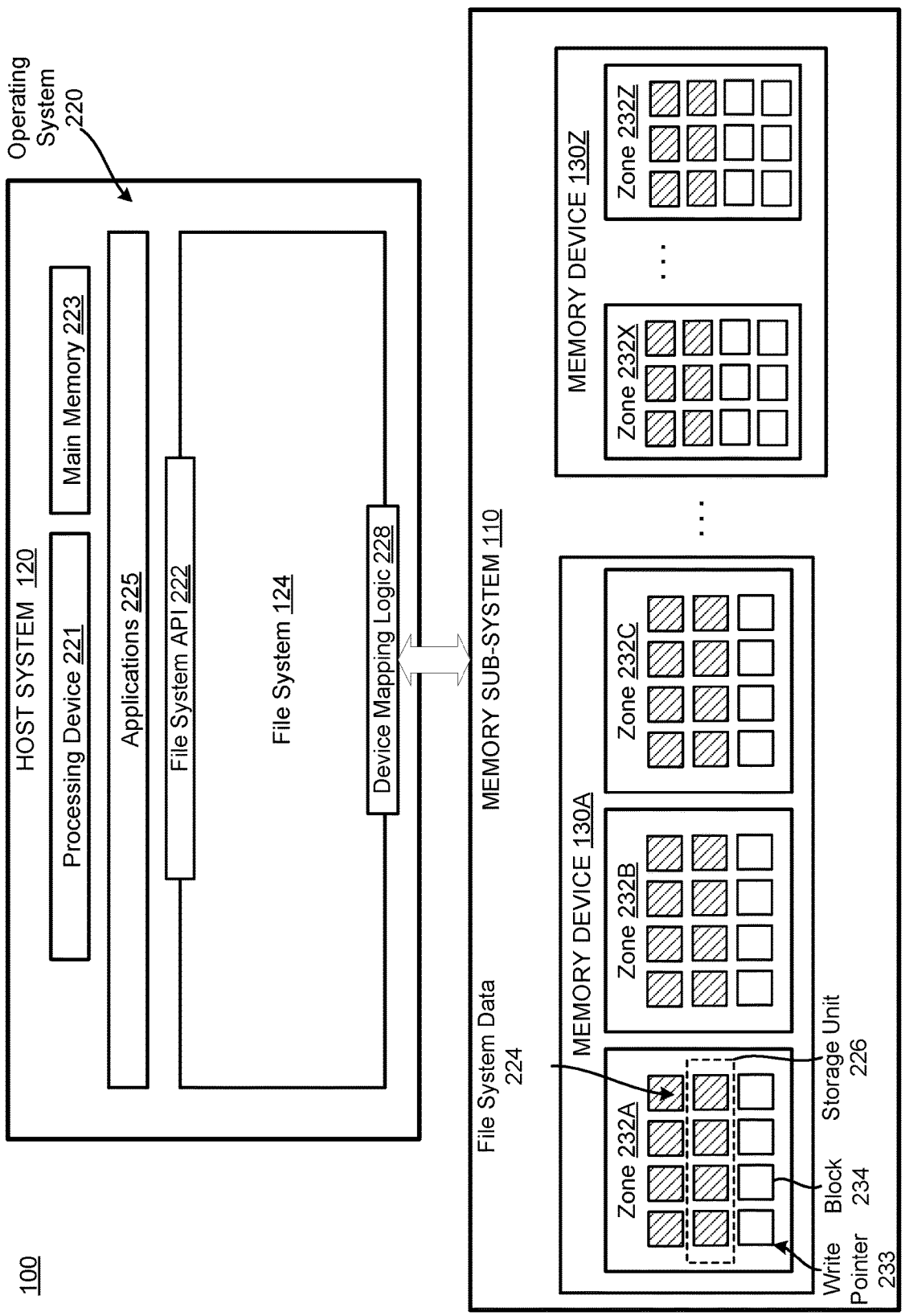
FIG. 2 is a detailed block diagram of the computing system of FIG. 1 in accordance with some embodiments of the present disclosure.

FIG. 2 is a detailed block diagram of the computing system 100 that includes a file system that uses the multiple zones of a memory sub-system to more efficiently store data. In the example shown, host system 120 includes a file system 124, one or more applications 225 and the memory sub-system 110 includes multiple zones 232A-Z that are spread across one or more memory devices 130A-Z.

File system 124 can manage the storage and retrieval of data from the memory sub-system 110. File system 124 can utilize data structures and rules used to organize the data, which can involve separating the data into storage units that that can be individually identified and accessed. File system 124 can be integrated into a kernel, a device driver, an application, other portion of operating system 220, or a combination thereof. File system 124 can execute as one or more system processes (e.g., kernel processes), user processes (e.g., application processes), or a combination thereof.

File system 124 can include multiple layers and the multiple layers can include a logical file system (e.g., logical layer), a virtual file system (e.g., virtual layer), a physical file system (e.g., physical layer), or other layer. The logical file system can manage interaction with applications 225 and can provide an application program interface (e.g., File System API 222) that exposes file system operations (e.g., open, close, create, delete, read, write, execute) to other computer programs. The logical layer of file system 124 can manage security and permissions and maintain open file table entries and per-process file descriptors. The logical file system can pass requested operations (e.g., write requests) to one or more other layers for processing. The virtual file system can enable operating system 220 to support multiple concurrent instances of physical file systems, each of which can be referred to as a file system implementation. The physical file system can manage the physical operation of the storage device (e.g. memory sub-system 110). The physical file system can handle buffering and manage main memory and can be responsible for the physical placement of storage units in specific locations on the memory devices 130A-Z. The physical file system can include device mapping logic 228 and can interact with device drivers or with the channel to interact with memory sub-system 110. One or more of the file system layers can be explicitly separated or can be combined together in order to store file system data 224.

File system data 224 can be any data associated with file system 124 and can include data received by file system 124 or data generated by file system 124. File system data 224 can represent data of one or more external file system objects, internal file system objects, or a combination thereof. The external file system objects can be file system objects that are externally accessible by a computer program (e.g., applications 225) using file system API 222. The external file system objects can include files (e.g., file data and metadata), directories (e.g., folders), links (e.g., soft links, hard links), or other objects. The internal file system objects can be file system objects that remain internal to the file system and are inaccessible using file system API 222. The internal file system objects can include storage tree objects (e.g., extent map, extent tree, block tree), stream objects (e.g., stream identifiers), file group data (e.g., group of similar files), storage units, block groups, extents, or other internal data structures.

Each file system object can include object data and can be associated with object metadata. The object data can be the content of the object (e.g., file data) and the object metadata can be information about the object (e.g., file metadata). The object metadata can indicate attributes of the object such as a storage location (e.g., zone, block group, storage unit), data source (e.g., stream, application, user), data type (e.g., text, image, audio, video), size (e.g., file size, directory size), time (e.g., creation time, modification time, access time), ownership (e.g., user ID, group ID), permissions (e.g., read, write, execute), file system location (e.g., parent directory, absolute path, local path), other attribute, or a combination thereof. In one example, file system data 224 can include data for a new file and the new file can include file data and file metadata. The file data can include the content of the file (e.g., image content, audio content) and the file metadata can include one or more attributes of the content (e.g., identifier corresponding to a zone z, stream s, and/or application a).

The object data and object metadata (e.g., attributes, tree nodes) can be stored together in the same data structure at the same storage location or can be stored separately in different data structures at different storage locations. For example, file system 124 can store the object metadata in an index node ("inode") data structure and the index node data structure can have one or more pointers to the object data. The inode can be a data structure in a Unix-style file system that describes a file system object. Each inode can indicate the attributes and storage locations (e.g., block addresses) of the data of the file system object. A directory can be represented by an inode and can contain an entry for itself, its parent (e.g., parent directory), and each of its children (e.g., child directories or files). File system 124 can store file system data 224 as one or more storage units 226.

Storage unit 226 can be a contiguous or non-contiguous portion of file system data that is to be stored in a memory device. The storage units can be referred to as file system storage units and can have any size (e.g., 4 KB, 128 KB, 16 MB, 128 MB, 1 GB) and the size can or cannot be based on (e.g. a multiple of) the size of one or more memory storage units (e.g., cells, blocks, pages, zones, dies, devices, or sub-systems). File system 124 can use a fixed size (e.g., constant size or static size) for the storage units in which all of the storage units can be the same size or can use a variable size (e.g., adjustable size, dynamic size) in which the storage units used by file system 124 can have different sizes. The size of the storage unit can be determined (e.g., selected or detected) by file system 124, host system 120, memory sub-system 110, memory device 130, other entity, or a combination thereof. The size of storage unit 226 can be determined by the entity before, during, or after design, development, manufacture, installation, initialization, configuration, formatting, other event, or a combination thereof. In one example, each of the storage units 226 can be the same or similar to a file system block group.

File system 124 can divide allocated space into block groups which can be variable-sized allocation regions. The allocation regions can be used to store object metadata (e.g., extent tree node, inodes) and object data (e.g., file content, extents). A block group (BG) can be understood as a contiguous portion a file system object (e.g., a series of LBAs) that is allocated to a contiguous area of a memory device and is reserved for file system data of file system 124. This contiguous area can be represented as a range of block numbers (e.g., logical addresses).

Memory sub-system 110 can include high density non-volatile memory devices where retention of data is desired when no power is supplied to the memory device. One example of non-volatile memory devices is a negative-and (NAND) memory device. Other examples of non-volatile memory devices are described above in conjunction with memory device 130 of FIG. 1. A non-volatile memory device is a package of one or more dies with sets of blocks (e.g., physical blocks) and each block can include a set of pages. A page can include a set of memory cells and each cell can be an electronic circuit that stores information. Depending on the cell type, a cell can store one or more bits of binary information and can have various logic states that correlate to the number of bits being stored. The logic states can be represented by binary values, such as "0" and "1", or combinations of such values.

Each memory devices 130A-Z can include one or more arrays of memory cells arranged in a two-dimensional grid. Memory cells are typically joined by wordlines (conducting lines electrically connected to the cells' control gates) and programmed together as memory pages (e.g., 16 KB or 32 KB pages) in one setting (by selecting consecutive bitlines connected to the cells' source and drain electrodes). The intersection of a bitline and wordline can constitute the address of the memory cell. A block 234 can refer to a unit of the memory device (e.g., 130A) used to store data and can include a group of memory cells, a wordline group, a wordline, or individual memory cells. One or more blocks can be grouped together to form a zone of a memory device.

Each of the zones 232A-Z can be a contiguous or non-contiguous portion of a memory device (e.g., range of blocks) that is identified and managed as a single unit. Each zone can have a corresponding zone identification data that can be used to uniquely identify the zone and can include a zone identifier (zone ID), a zone descriptor, or a zone label. Memory sub-system 110 can use a fixed size (e.g., constant size or static size) for the zones in which all of the zones can be the same size or can use a variable size (e.g., adjustable size, dynamic size) in which the zones used by memory sub-system 110 can have different sizes. The size of the zone can be determined by memory sub-system 110, memory device 130, file system 124, host system 120, other entity, or a combination thereof.

Zones 232A-Z can enable efficient management of storage space of the memory device. For example, a set of one or more zones can be designated for use by a specific application (e.g., application, process, or thread) executed by the host system or some other system with access to the memory device. Writing to the zones is generally performed sequentially. The sequential write can be performed consecutively from the top of the memory device (e.g., smaller addresses of IC die) to the bottom of the memory device (e.g., larger addresses of the IC die), which is illustrated by the patterned blocks of data already written to the illustrated zones 232A-Z. In these embodiments, the device mapping logic 228 can track block numbers (e.g., logical block addresses) of a namespace.

The namespace can be referenced by the address space of one or more of the memory devices 130A-Z. A namespace is a segment of memory that can be split into multiple management units (e.g., logical or physical blocks). A controller for memory devices 130A-Z (e.g., controller 115 or 135) can support multiple namespaces that are referenced using namespace identification data (e.g., namespace IDs). A namespace can be associated with a namespace data structure that is created, updated, or deleted using Namespace Management and Namespace Attachment commands. The namespace data structure can indicate capabilities and settings that are specific to a particular namespace. In one example, the name data structure and the namespace can correspond to a zoned namespace.

A zoned namespace (ZNS™) can be a sequential namespace that is defined by the NVM Express™ (NVMe™) Specification. A memory device that is configured with a zone namespace can be referred to as a zoned namespace memory device or a ZNS memory device and can implement the Zoned Namespace Command Set as defined by NVMe. In a zone namespace, the address space of each of the memory devices 130A-Z can be divided into one or more zones 232A-Z. When using a zone namespace, writes are performed sequentially starting from the beginning of a zone and can be performed at a different granularities (e.g., e.g., 64 kilobytes, 128 kilobytes, etc.). In one example, the zoned namespace can be implemented by a controller of a solid state drive (SSD) and include zones 232A-Z, in which there can be one or more zones for each of the one or more memory devices 130A-Z.

A write pointer (WP) identifies a location in the zone where a prior sequential write ended. A WP can be maintained for each of zones 232A-Z. The write pointer 233 can correspond to zone 232A and can point to the beginning of a block (e.g., first available block), the end of a block (e.g., last block written to), a location within a block. Write pointer 233, which can be stored in a metadata area of memory device 130A-Z, can be maintained by the controller of memory device 130A (e.g., controller 135), a controller of memory sub-system 110 (e.g., controller 115), and/or processing device 221 of host system 120 (e.g., in main memory 223).

File system 124 can maintain a file system API 222 that enables computer programs (e.g., applications 225) to store or retrieve data. File system API 222 can enable file system 124 to receive data from external sources, including data from applications 225 (also referred to as user data), operating system (e.g., superblocks of data, file system metadata, and the like). With access to such metadata about these various files of different data types, the file system API 222 can be able to enable file system 124 to perform organization and storage allocation.

The applications 225 can include different types of computer programs or architectures, which function differently with respect hardware and supporting software of the computing system 100. Each of the applications 225 can thus generate, access, and/or manage files of one or more data types.

Figure 3:
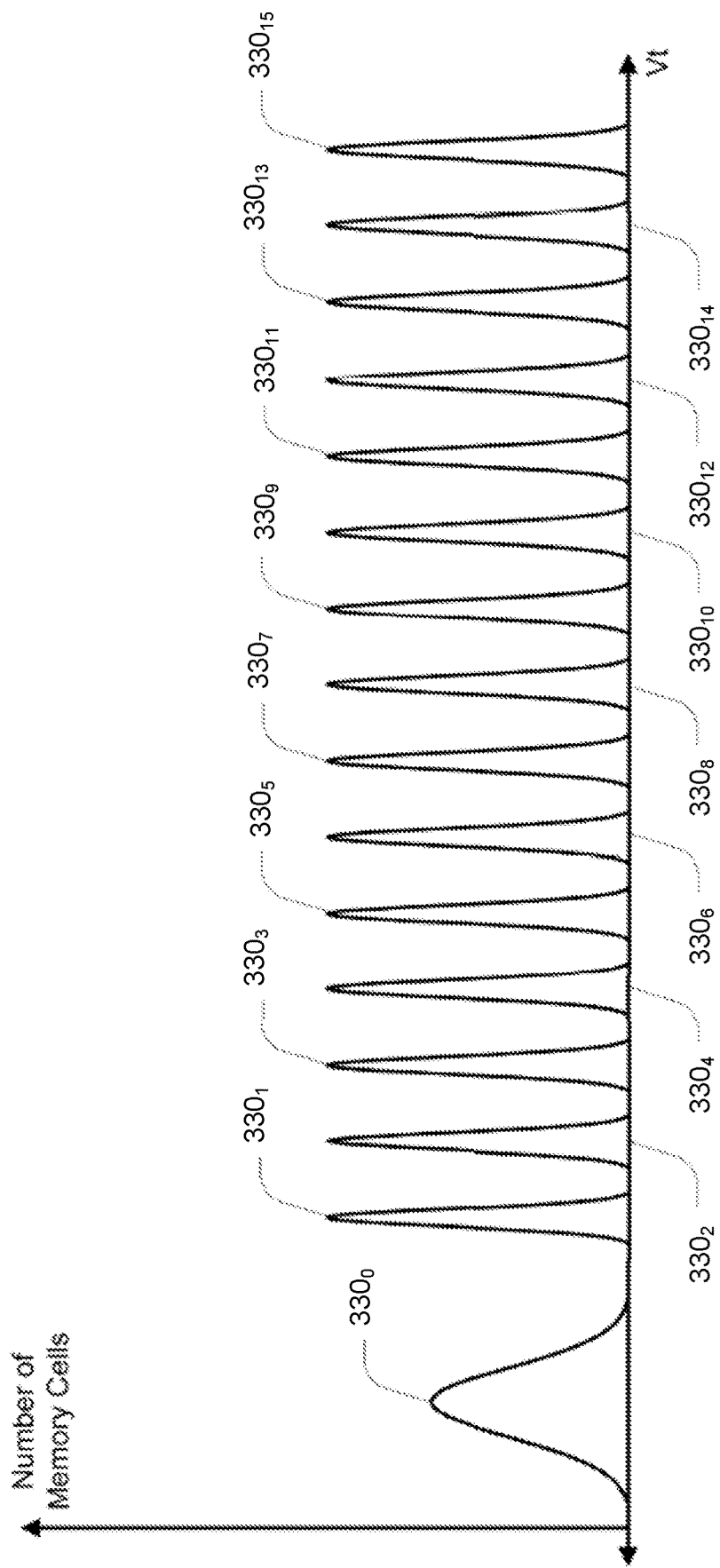
FIG. 3 is a conceptual depiction of threshold voltage distributions of multiple memory cells of a memory array according to an embodiment.

FIG. 3 is a conceptual depiction of threshold voltage ranges of multiple memory cells. FIG. 3 illustrates an example of threshold voltage ranges and their distributions for a population of a sixteen-level memory cells, e.g., QLC memory cells. For example, such a memory cell can be programmed to a threshold voltage (Vt) that falls within one of sixteen different threshold voltage ranges $330_0$-$330_{15}$, each being used to represent a data state corresponding to a bit pattern of four bits. The threshold voltage range $330_0$ typically has a greater width than the remaining threshold voltage ranges $330_1$-$330_{15}$ as memory cells are generally all placed in the data state corresponding to the threshold voltage range $330_0$, then subsets of those memory cells are subsequently programmed to have threshold voltages in one of the threshold voltage ranges $330_1$-$330_{15}$. As programming operations are generally more incrementally controlled than erase operations, these threshold voltage ranges $330_1$-$330_{15}$ can tend to have tighter distributions.

TABLE 1

| Data State | Logical Data Value |
|---|---|
| L0 | 1111 |
| L1 | 0111 |
| L2 | 0011 |
| L3 | 1011 |
| L4 | 1001 |
| L5 | 0001 |
| L6 | 0101 |
| L7 | 1101 |
| L8 | 1100 |
| L9 | 0100 |
| L10 | 0000 |
| L11 | 1000 |
| L12 | 1010 |
| L13 | 0010 |
| L14 | 0110 |
| L15 | 1110 |

The threshold voltage ranges $330_0$, $330_1$, $330_2$, $330_3$, $330_4$, $330_5$, $330_6$, $330_7$, $330_8$, $330_9$, $330_{10}$, $330_{11}$, $330_{12}$, $330_{13}$, $330_{14}$, and $330_{15}$ can each represent a respective data state, e.g., L0, L1, L2, L3, L4, L5, L6, L7, L8, L9, L10, L11, L12, L13, L14 and L15, respectively. As an example, if the threshold voltage of a memory cell is within the first of the sixteen threshold voltage ranges $330_0$, the memory cell in this case can be storing a data state L0 having a data value of logical '1111' and is typically referred to as the erased state of the memory cell. If the threshold voltage is within the second of the sixteen threshold voltage ranges $330_1$, the memory cell in this case can be storing a data state L1 having a data value of logical '0111'. If the threshold voltage is within the third of the sixteen threshold voltage ranges $330_2$, the memory cell in this case can be storing a data state L2 having a data value of logical '0011,' and so on. Table 1 provides one possible correspondence between the data states and their corresponding logical data values. Other assignments of data states to logical data values are known or can be envisioned. Memory cells remaining in the lowest data state (e.g., the erased state or L0 data state), as used herein, will be deemed to be programmed to the lowest data state.

Figure 4:
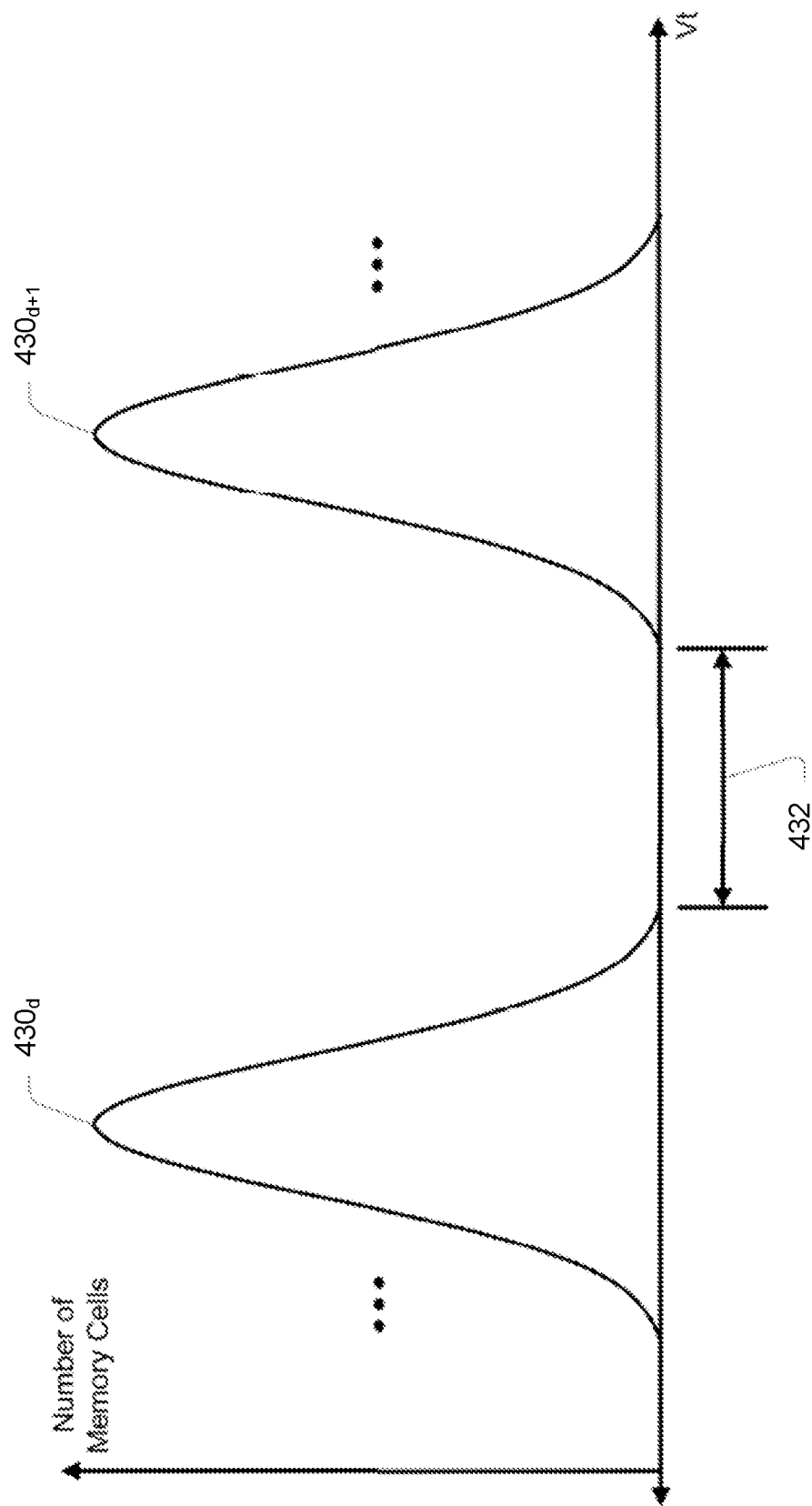
FIG. 4 is a conceptual depiction of a threshold voltage distribution of multiple memory cells at one stage following programming for use with various embodiments.

FIG. 4 is a conceptual depiction of a threshold voltage distribution of multiple memory cells following a programming operation. The threshold voltage distributions $430_d$-$430_{d+1}$ of FIG. 4 can represent some portion of the distributions for threshold voltage ranges $330_0$-$330_{15}$ of FIG. 3 at the completion of a programming operation for memory cells. With reference to FIG. 4, adjacent threshold voltage distributions 430 are typically separated by some read window margin 432 (e.g., dead space) at the completion of programming. Applying a sense voltage (e.g., read level voltage) within the read window margin 432 to the control gates of the multiple memory cells can be used to distinguish between the memory cells of the threshold voltage distribution $430_d$ (and any lower threshold voltage distribution) and the memory cells of the threshold voltage distribution $430_{d+1}$ (and any higher threshold voltage distribution).

Due to the phenomenon known as slow charge loss (SCL), the threshold voltage of a memory cell changes in time as the electric charge of the cell is degrading, which is referred to as "temporal voltage shift" (since the degrading electric charge causes the voltage distributions to shift along the voltage axis towards lower voltage levels). The threshold voltage is changing rapidly at first (immediately after the memory cell was programmed, referred to as quick charge loss (QCL)), and then slows down in an approximately logarithmic linear fashion with respect to the time elapsed since the cell programming event. This temporal voltage shift, if left unadjusted, reduces the read window margin 432 between the threshold voltage distributions $430_d$-$430_{d+1}$ over time, and can cause these threshold voltage distributions to overlap, making it more difficult to distinguish between adjacent threshold voltage distributions.

FIG. 5A is a graph illustrating an example of a set of threshold voltage distributions, after coarse programming, that are not readable according to at least one embodiment. Coarse programming can be compared to initial pass programming in which the Vt distributions are highly overlapped when coarse programming many Vt distributions, e.g. as is the case in programming QLC memory. Due to this overlapping of the Vt distributions, the coarse-programmed sets of threshold Vt distributions may also be referred to herein as intermediate Vt distributions. This overlapping occurs due to less precise programming in which each Vt distribution widely covers a range of threshold voltage that coarsely approximates a more accurate (finer) threshold voltage range that is intended for each respective Vt distribution.

FIG. 5B is a graph illustrating the example of the set of threshold voltage distributions (FIG. 5B), after fine programming, that are readable according to at least one embodiment. When fine programming is completed, e.g., to a final set of Vt distributions, each Vt distribution is more finely defined over a focused threshold voltage range intended for each respective logical state. When this occurs, the read window margins between respective Vt distributions are widened such that individual logical states across different memory cells of a set of memory cells can be distinguished when read.

While the overlap between coarsely-programmed Vt distributions is more pronounced in QLC programming, the disclosed consecutive coarse and fine programming operations can be performed on differing types of memory where coarse programming can initially be carried out in a fewer number of intermediate Vt distributions followed by consecutive coarse and fine programming of a larger number of final Vt distributions, as will be discussed. Also, as was mentioned, the touch-up effect of performing fine programming on the set of memory cells after a coarse programming of the same number of Vt distributions leads to improved read window margins (or RWB) and QCL.

FIG. 6A is schematically illustrates example zone-to-block metadata maintained by the memory device, in accordance with aspects of the present disclosure. In particular, zone-to-block metadata table 610 illustrates an example set of SLC blocks (e.g., SLC blocks A-D) assigned to store data from zones 0-3. For each write command received, the media management controller 113 (or local media controller 135) can identify the zone specified, by the host system, by the write command. The media management controller 113 can then identify the block assigned to the zone using zone-to-block metadata table 610. In some embodiment, once the data stored on a block (e.g., SLC block A) reaches a capacity level, the media management controller 113 can open a new block (e.g., SLC block C) for one or more zone(s) assigned to the capacity reached block (e.g., SLC block A). As illustrated by 610, SLC block A can stored data related to zones Z0, Z1, Z2, and Z3, SLC block B can stored data related to zones Z4, Z5, Z6, and Z7, SLC block C can stored data related to zones Z0, Z1, Z2, and Z3, SLC block D can stored data related to zones Z8, Z9, Z10, and Z11, etc. Each block storing data from four different zones is used by way of illustrative example. It is noted that each block can be assigned any number of zone (e.g., one zone, two zone, five zones, eight zones, etc.). In some embodiments, the zone-to-block metadata can be maintained in local memory 119. In other embodiments, the zone-to-block metadata can be maintained on memory device 130.

FIG. 6B is a conceptual depiction of zone data stored on SLC blocks A and C, in accordance with aspects of the present disclosure. Each block can store zone-specific data to one or more memory pages of the SLC block. As illustrated, SLC blocks A and C store data for zones Z0, Z1, Z2, and Z3. The media management controller 113 can store data received, from the host system, for zones Z0-Z3 to one or more available memory page.

FIG. 6C is schematically illustrates example block capacity metadata maintained by the memory device, in accordance with aspects of the present disclosure. In particular, block capacity metadata table 600 illustrates the composition of zone data stored on SLC blocks A, C, F, and G, each of which stores data for zones 0-3. As illustrated, for SLC block A, 90% of its capacity includes zone 0 data, 5% of its capacity includes zone 1 data, and 5% of its capacity includes zone 2 data. For SLC block C, 90% of its capacity includes zone 0 data, 5% of its capacity includes zone 1 data, and 5% of its capacity includes zone 2 data. For SLC block C, 95% of its capacity includes zone 0 data, and 5% of its capacity includes zone 3 data. SLC block G is assigned to store data for zones 0-3, but has not been utilized yet. In some embodiments, the block capacity metadata can be maintained in local memory 119. In other embodiments, the block capacity metadata can be maintained on memory device 130.

Figure 7:
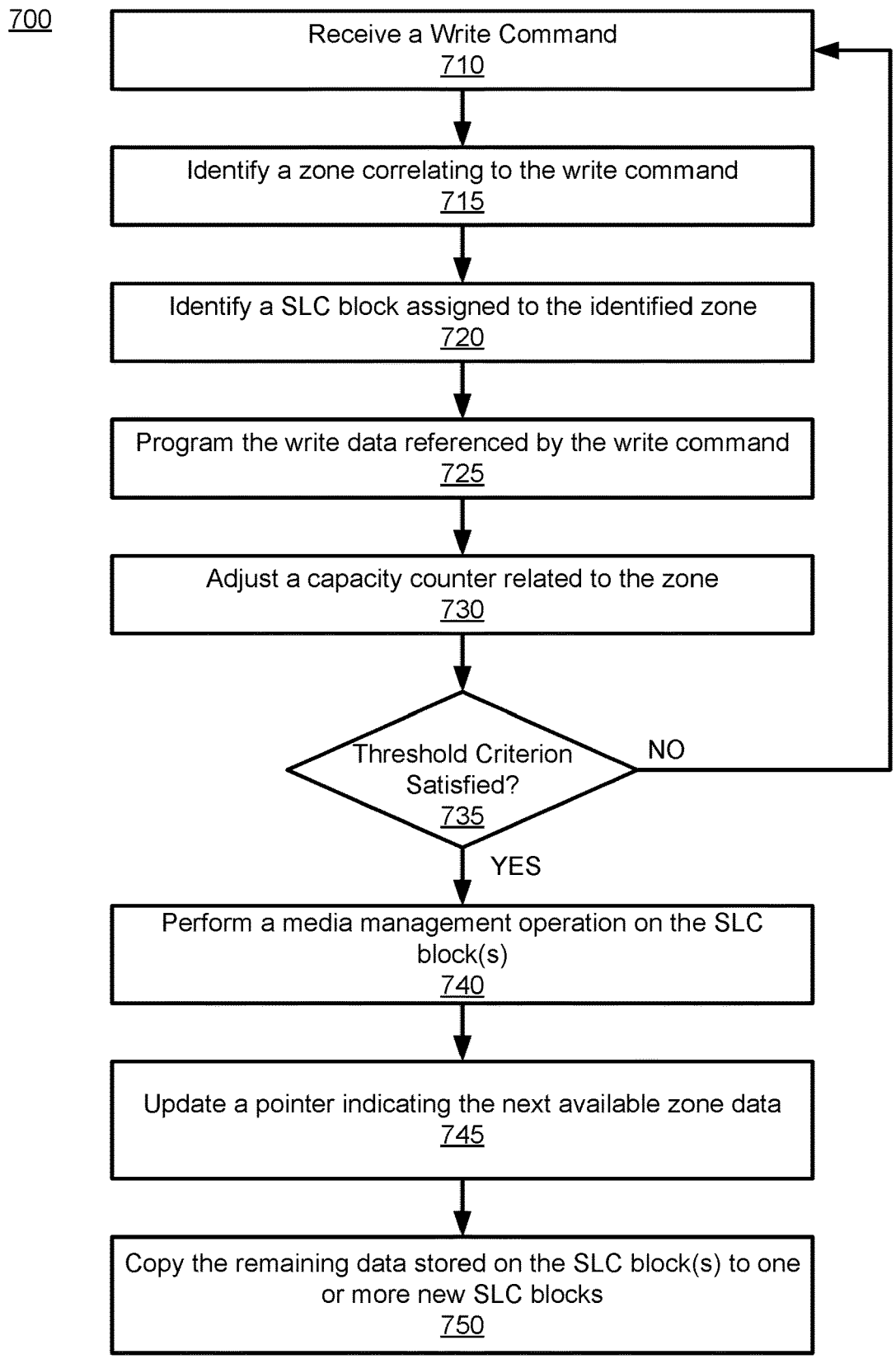
FIG. 7 is a flow chart of a method for performing data compaction in ZNS systems, in accordance with some embodiments of the present disclosure.

FIG. 7 is a flow diagram of an example method 700 for performing data compaction in ZNS systems, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the memory sub-system controller 115 (e.g., by media management component 113) of FIG. 1, by the local media controller 135 of FIG. 1, or any combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic receives a write command. The write command can be initiated by a host (e.g., host 120) or by a memory sub-system controller (e.g., memory sub-system controller 115). The write command can reference a logical memory address.

At operation 715, the processing logic identifies the zone correlating to the write command. In some embodiments, the processing logic can use the memory address referenced by the write command to identify the assigned zone via a reference table (e.g., a metadata table). For example, the processing logic can use the reference table to determine that the memory address is assigned to zone 0. In some embodiments, the write command can specify the desired zone.

At operation 720, the processing logic identifies the SLC block assigned to the identified zone. In some embodiments, the processing logic can use a reference table (e.g., zone-to-block metadata table 610), to determine which SLC block is assigned to store data for the identified zone. In embodiments where the identified zone is not assigned to an SLC block, or the SLC block is filled to capacity, the processing logic can open a new SLC block and assign the zone to the new SLC block by, for example, adding an entry of the relationship in the reference table (e.g., zone-to-block metadata table 610).

At operation 725, the processing logic programs the write data referenced by the write command to the SLC block. For example, the processing logic can identify one or more wordlines that address a set of memory cells (e.g., a page(s)) of the SLC block onto which to program the data referenced by the write command. The processing logic can retrieve the write data from a memory device or a cache and program the write data onto the memory cells. To program the write data, the processing logic can apply a certain voltage to each memory cell, which results in an electric charge being held by each memory cell.

At operation 730, the processing logic adjusts a capacity counter related to the zone. The capacity counter can include any mechanism used to track data stored to the SLC blocks assigned to each particular zone. For example, the capacity counter can track the amount of data, stored to SLC blocks, that is correlated to each of zone 0, zone 1, zone 2, etc. In some embodiments, the processing logic can adjust the capacity counter by updating a reference table (e.g., capacity metadata table 620). For example, referring to FIG. 6C, if the data was programmed to SLC block G and the data is correlated to zone 0, the processing logic can update the corresponding entry in capacity metadata table 620 to reflect the amount of data (e.g., amount of memory pages) programmed to SLC block G.

At operation 735, the processing logic determines whether the amount of stored SLC data corresponding to the particular zone satisfies a compaction threshold criterion. The compaction threshold criterion can be a predetermined value reflecting a minimum amount of zone-specific data (data corresponding to a particular zone) required for the processing logic to trigger a media management operation (e.g., folding operation) to copy the zone specific data from the SLC block(s) to a HLC block (e.g., a QLC block). In an illustrative example, the compaction threshold criterion can be a threshold value reflecting 50% of the storage capacity of a QLC block. In an example, the processing logic can determine, using the capacity counters for SLC blocks storing data corresponding to zone 0, whether the SLC blocks store enough zone 0 data to fill at least 50% of the storage capacity of a QLC block.

The compaction threshold criterion can be determined and set during manufacturing of the memory sub-system 110 or during programming and/or calibration of the memory sub-system 110. The compaction threshold criterion of 50% is used by way of illustrative example, and can be any value, such as 40% capacity, 60% capacity, 80% capacity, 100% capacity, a predetermined amount of memory pages, a predetermined amount of any other granularity of memory size, etc. In some embodiments, an HLC block can include multiple types of cells. In an illustrative example, a QLC block can include QLC wordlines and an MLC wordline in the middle of the memory array. As such, the MLC wordline is reached once 50% of the QLC block is programmed (e.g., in a block with 200 wordlines, the MLC wordline can be wordline 100). Accordingly, since MLC pages are not programmed using coarse-fine programming, the processing logic can program to and including the MLC wordline (e.g., 50%), and the data will not experience slow charge loss. Accordingly, compaction threshold criterion can be set to wordline (or any other management unit, such as one or more pages, etc.) having a cell type (e.g., SLC, MLC) than the remainder of the block (e.g., QLC). For example, if a QLC block has three MLC wordlines (e.g., at the 25% capacity, 50% capacity, and 75% capacity), the compaction threshold criterion can be set to 25% capacity, 50% capacity, and 75% capacity.

Responsive to the amount of stored SLC data corresponding to a particular zone failing to satisfy the compaction threshold criterion, the processing logic proceeds to operation 710, where the processing logic can receive a new write command. Responsive to the amount of stored SLC data corresponding to a particular zone satisfying the compaction threshold criterion, the processing logic proceeds to operation 740.

At operation 740, the processing logic performs a media management operation on the SLC block(s) storing the zone specific data. In some embodiments, the media management operation (e.g., a folding operation) can copy the identified zone data (e.g., zone 0 data) stored on the SLC block(s) to an available destination block (e.g., an empty QLC block) of the memory sub-system. The destination block can include any type of HLC memory cells (e.g., MLC, TLC, QLC, PLC, etc.). The data can be programmed to the destination block using coarse-fine programming. In some embodiments, once the data is programmed, the destination block can be closed. In an example, the processing logic can select an available QLC block from a pool of available QLC blocks, and write data stored on each page corresponding to zone 0 of the source block to a respective new page on the QLC block. In some embodiments, prior to writing the data from the SLC block(s) to the destination block, the processing logic can perform one or more error correction operations on the data stored on the source block.

In some embodiments, the processing logic can program only a particular amount of zone specific data to the destination block. In some embodiments, the particular amount of zone specific data can be reflective of the compaction threshold criterion. For example, if the compaction threshold criterion is set to 50% of the storage capacity of a QLC block, and the amount of SLC data stored for a particular zone (e.g., zone 0) is at 55% of the storage capacity of the QLC block, the processing logic can program, to the QLC block, zone specific data reflecting 50% of the storage capacity of the QLC block, whereas the remaining 5% of the data remains on the SLC block(s).

To keep track of which zone specific data was compacted, and which zone specific data remains on the SLC blocks, the processing logic can maintain a metadata table (e.g., data index metadata table 810 of FIG. 8). In particular, FIG. 8 schematically illustrates example data index metadata maintained by the memory device, in accordance with aspects of the present disclosure. In some embodiments, memory sub-system controller 115 and/or local media controller 135 can maintain data index metadata table 810. In some embodiments, data index metadata table 810 can be stored in the local memory of memory sub-system controller 115 and/or local media controller 135 and can be referenced to determine, for one or more particular zones, which locations (e.g., wordlines, memory page, etc.) of an SLC block contain data. As illustrated by data index metadata table 810, locations 0 and 4 contain data related to zone 0, locations 1, 6 and 6 contain data related to zone 1, location 2 contains data related to zone 2, and locations 3, n−1, and n contain data related to zone 3. Index metadata table 810 can store pointer data for one or more SLC blocks.

To track which zone data remains on the SLC block(s) after the media management operation of operation 740, the processing logic can, in operation 745, update a pointer indicating the next available zone data. For example, referencing data index table 840, for zone 1, if the media management operation hit the 50% of the storage capacity of a QLC block after it folded the data stored at location 1 and 5, the processing logic can set the pointer to location 6. According, during a subsequent media management operation related to zone 1, the processing logic can copy zone 1 data starting from location 6.

At operation 750, the processing logic can copy the remaining data stored on the SLC block(s) to one or more new SLC blocks. For example, the processing logic can, from the SLC blocks from which data related to zone 0 was compacted at operation 740, perform a media management operation to copy the data related to zones 1, 2, and 3 to the one or more new SLC blocks. The copied from SLC blocks can then be returned to a free pool of SLC blocks for future use.

Figure 9:
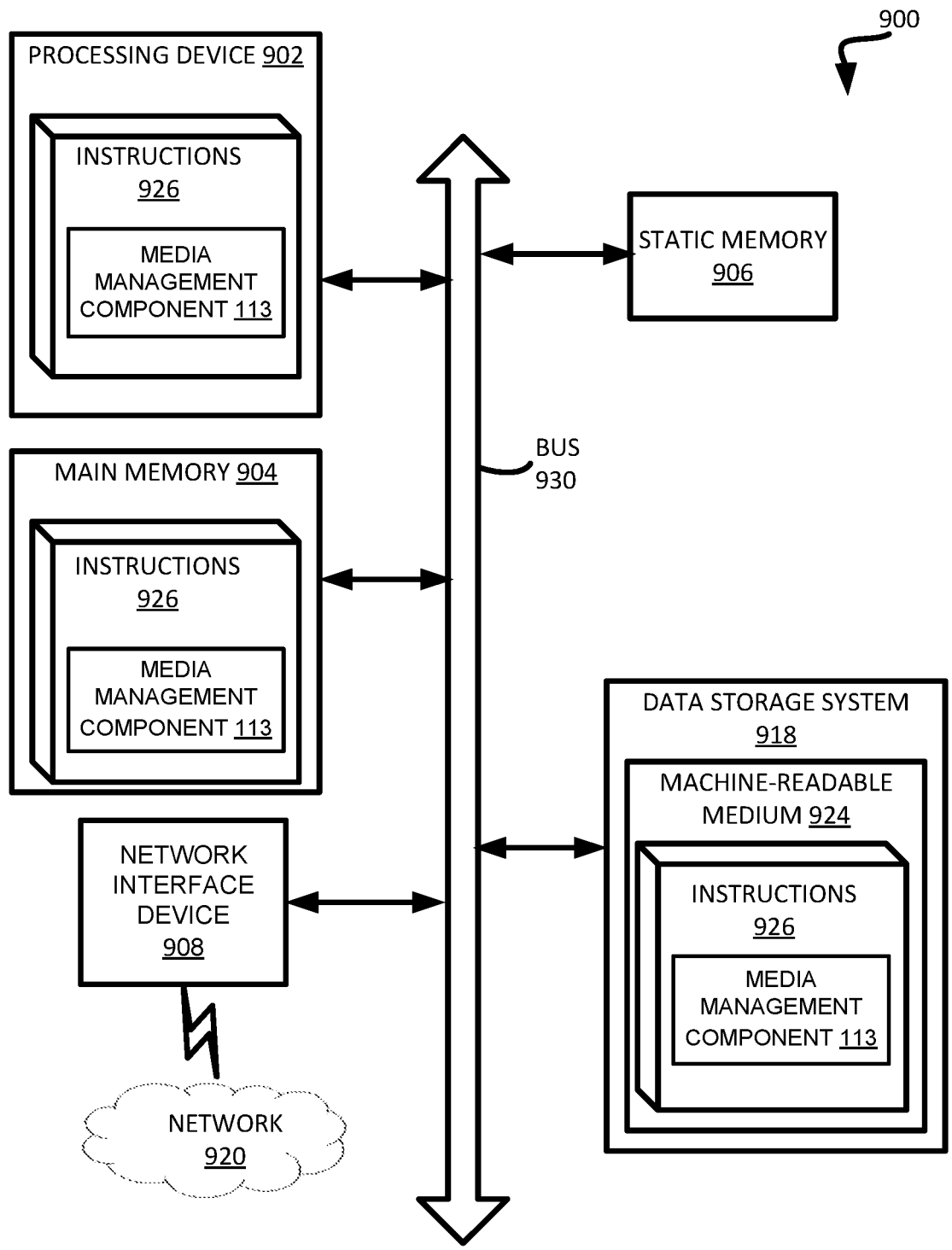
FIG. 9 is a block diagram of an example computer system in which embodiments of the present disclosure can operate.

FIG. 9 illustrates an example machine of a computer system 800 within which a set of instructions, for causing the machine to perform any one or more of the methodologies discussed herein, can be executed. In some embodiments, the computer system 900 can correspond to a host system (e.g., the host system 120 of FIGS. 1-2) that includes, is coupled to, or utilizes a memory sub-system (e.g., memory sub-system 110 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a non-transitory computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to media management component 113 of FIG. 1. While the machine-readable storage medium 924 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving, by a processing device, a write command;
identifying a zoned namespace (ZNS) zone specified with the write command;
selecting a first subset of memory pages of a first management unit of a memory device that is configured to store a first number of bits per memory cell, wherein the first management unit is associated with the ZNS zone;
accessing a capacity counter associated with the ZNS zone wherein the capacity counter reflects an amount of data currently stored on a set of blocks associated with the ZNS zone; and
responsive to determining that the capacity counter satisfies a threshold criterion, causing the memory device to copy the data associated with the ZNS zone from the first subset of memory pages to a second subset of memory pages of a second management unit of the memory device, wherein the second subset of memory pages is configured to store a second number of bits per memory cell, wherein the second number of bits per memory cell exceeds the first number of bits per memory cell.

2. The method of claim 1, further comprising:
copying remaining data from the first management unit to a third subset of memory cells associated with a third management unit of the memory device that are configured to store the first number of bits per memory cell.

3. The method of claim 1, further comprising:
identifying, in a metadata table, un-migrated data associated with the ZNS zone, wherein the un-migrated data was not copied from the first set of memory cells to the second set of memory cells.

4. The method of claim 1, wherein the threshold criterion is set in view of a ratio of storage capacity of the second management unit.

5. The method of claim 1, wherein the first set of memory cells are configured as single-level cell (SLC) memory.

6. The method of claim 1, wherein the second set of memory cells are configured as quad-level cell (QLC) memory.

7. The method of claim 1, wherein the management unit is configured to store data from a single ZNS zone.

8. The method of claim 1, wherein the management unit is configured to store data from a subset of ZNS zones.

9. A system comprising:
a memory device; and
a processing device, operatively coupled with the memory device, to perform operations comprising:
receiving, by a processing device, a write command;
identifying a zoned namespace (ZNS) zone specified with the write command;
selecting a first subset of memory pages of a first management unit of the memory device that is configured to store a first number of bits per memory cell, wherein the first management unit is associated with the ZNS zone;
accessing a capacity counter associated with the ZNS zone wherein the capacity counter reflects an amount of data currently stored on a set of blocks associated with the ZNS zone; and
responsive to determining that the capacity counter satisfies a threshold criterion, causing the memory device to copy the data associated with the ZNS zone from the first subset of memory pages to a second subset of memory pages of a second management unit of the memory device, wherein the second subset of memory pages is configured to store a second number of bits per memory cell, wherein the second number of bits per memory cell exceeds the first number of bits per memory cell.

10. The system of claim 9, wherein the operations further comprise:
copying remaining data from the first management unit to a third subset of memory cells associated with a third management unit of the memory device that are configured to store the first number of bits per memory cell.

11. The system of claim 9, wherein the operations further comprise:
identifying, in a metadata table, un-migrated data associated with the ZNS zone, wherein the un-migrated data was not copied from the first set of memory cells to the second set of memory cells.

12. The system of claim 9, wherein the threshold criterion is set in view of a ratio of storage capacity of the second management unit.

13. The system of claim 9, wherein the first set of memory cells are configured as single-level cell (SLC) memory.

14. The system of claim 9, wherein the second set of memory cells are configured as quad-level cell (QLC) memory.

15. The system of claim 9, wherein the management unit is configured to store data from a single ZNS zone.

16. The system of claim 9, wherein the management unit is configured to store data from a subset of ZNS zones.

17. A non-transitory computer-readable medium storing instructions, which when executed by a processing device, cause the processing device to perform operations comprising:
receiving, by a processing device, a write command;
identifying a zoned namespace (ZNS) zone specified with the write command;
selecting a first subset of memory pages of a first management unit of a memory device that is configured to store a first number of bits per memory cell, wherein the first management unit is associated with the ZNS zone;
accessing a capacity counter associated with the ZNS zone wherein the capacity counter reflects an amount of data currently stored on a set of blocks associated with the ZNS zone; and
responsive to determining that the capacity counter satisfies a threshold criterion, causing the memory device to copy the data associated with the ZNS zone from the first subset of memory pages to a second subset of memory pages of a second management unit of the memory device, wherein the second subset of memory pages is configured to store a second number of bits per memory cell, wherein the second number of bits per memory cell exceeds the first number of bits per memory cell.

18. The non-transitory computer-readable medium of claim 17, wherein the operations further comprise:
copying remaining data from the first management unit to a third subset of memory cells associated with a third management unit of the memory device that are configured to store the first number of bits per memory cell.

19. The non-transitory computer-readable medium of claim 17, wherein the operations further comprise:
identifying, in a metadata table, un-migrated data associated with the ZNS zone, wherein the un-migrated data was not copied from the first set of memory cells to the second set of memory cells.

20. The non-transitory computer-readable medium of claim 17, wherein the threshold criterion is set in view of a ratio of storage capacity of the second management unit.

* * * * *